United States Patent
Suchecki

(10) Patent No.: US 9,121,474 B2
(45) Date of Patent: Sep. 1, 2015

(54) ENGINE DRIVE SYSTEM

(75) Inventor: Tom Suchecki, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 779 days.

(21) Appl. No.: 13/174,458

(22) Filed: Jun. 30, 2011

(65) Prior Publication Data

US 2013/0005523 A1    Jan. 3, 2013

(51) Int. Cl.
| | |
|---|---|
| *F16H 7/08* | (2006.01) |
| *F16H 7/18* | (2006.01) |
| *F01L 1/02* | (2006.01) |
| *F02B 67/06* | (2006.01) |

(52) U.S. Cl.
CPC . *F16H 7/18* (2013.01); *F01L 1/022* (2013.01); *F02B 67/06* (2013.01); *F16H 2007/0812* (2013.01); *F16H 2007/0859* (2013.01); *F16H 2007/0893* (2013.01)

(58) Field of Classification Search
CPC .............. F16H 7/08; F16H 2007/0802; F16H 2007/0812; F16H 2007/0872; F16H 2007/0874
USPC ............... 474/84, 86–88, 109–111, 140, 148, 474/101, 103, 104; 123/192.1, 192.2
See application file for complete search history.

(56) References Cited

U.S. PATENT DOCUMENTS

| | | |
|---|---|---|
| 3,825,811 A | 7/1974 | Smith et al. |
| 4,432,433 A | 2/1984 | Ogawa |
| 4,729,348 A | 3/1988 | Okada et al. |
| 5,000,142 A | 3/1991 | Aruga et al. |
| 5,700,216 A | 12/1997 | Simpson |
| 6,332,469 B2 | 12/2001 | Treskov et al. |
| 6,332,470 B1 | 12/2001 | Fishkin et al. |
| RE37,798 E | 7/2002 | Uchiyama et al. |
| 7,476,168 B2 | 1/2009 | Markley et al. |
| 2004/0180745 A1* | 9/2004 | Dinca et al. .................... 474/135 |
| 2006/0137636 A1 | 6/2006 | Oshita et al. |
| 2007/0037646 A1 | 2/2007 | Markley et al. |
| 2007/0101960 A1 | 5/2007 | Bertram |
| 2011/0011363 A1* | 1/2011 | Solferino .................... 123/192.2 |
| 2011/0247892 A1* | 10/2011 | Jung ............................. 181/207 |

FOREIGN PATENT DOCUMENTS

| | | | | |
|---|---|---|---|---|
| EP | 1752645 A2 * | 2/2007 | ............. | F02B 67/06 |
| JP | 58119931 A | 7/1983 | | |
| JP | 2207142 A | 8/1990 | | |
| JP | 6146916 A | 5/1994 | | |

* cited by examiner

*Primary Examiner* — Sang Kim
*Assistant Examiner* — Juan Campos, Jr.
(74) *Attorney, Agent, or Firm* — James Dottavio; Alleman Hall McCoy Russell & Tuttle LLP

(57) ABSTRACT

Systems and methods for an engine drive system are described herein. In one example, the system includes a camshaft, a crankshaft, and an accessory drive. The system may include a first chain coupling the camshaft and crankshaft in a first plane, and a second chain coupling the accessory drive and crankshaft in a second plane non-planar to the first plane. The system may further include a chain guide including a first surface guidingly contacting the first chain and a second surface guidingly contacting the second chain.

19 Claims, 5 Drawing Sheets

ENGINE DRIVE SYSTEM

BACKGROUND AND SUMMARY

Vehicles may use a timing belt or chain to drive various features in an internal combustion engine.

For example, US 2006/0137636 A1 describes a cam drive gear and valve operating system drive gear for an engine. The system includes a chain guide member for each drive gear system.

The inventors herein have recognized various issues with the above system. In particular, increasing the number of chain guides for guiding various chains of different drive systems also increases the size and weight of the engine, as well as manufacturing complexity. Increased engine size and weight can adversely affect vehicle performance, for example, by decreasing fuel economy.

As such, one example approach to address the above issues is to arrange the engine drive system such that the number of chain guides can be reduced, while still sufficiently tensioning each chain. In this way, it may be possible to reduce the size and weight of the engine. Specifically, the chain guide may include a surface for guidingly contacting each chain. Further, the chain guide may include a tension adjustment mechanism for actuating each surface in guidingly contact with a chain. This configuration enables the chain guide to maintain tension in a plurality of drive systems that are not necessarily coplanar. Further, by taking advantage of a consolidated engine drive system, manufacturing costs can be reduced as the number of chain guides per engine drive system decreases.

Note that various chains may be used, such as a timing chain, a timing belt, or various other types of elastic and/or inelastic flexible bands. Further, the chain may mate to toothed or un-toothed pulleys on the various shafts. Further still, additional chains may also be used, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to an engine drive system that advantageously uses a chain guide for guiding a plurality of chains. Engine size and weight generally increases as the number of drive systems increase. Typically, each drive system may include a separate chain guide to maintain tension in each. The disclosed system includes a chain guide comprising a surface for guidingly contacting each chain of a drive system. Further, the chain guide may include a tension adjustment mechanism for each surface in guidingly contact with a chain in order to adjust and maintain chain tension. As described herein, the chain guide provides the potential advantage of reducing the engine size and weight as compared to an engine drive system that utilizes a separate chain guide for each chain of an engine drive system. Various configurations of the chain guide may be used. For example, the chain guide may include a plurality of surfaces for guidingly contacting a respective number of chains that span a corresponding number of shiv lines. As another example, the chain guide may include a plurality of surfaces for guidingly contacting a respective number of chains that span one or more drive shafts. Additionally, the chain guide may include one or more recessed surfaces to accommodate one or more wheels, pulleys, or other components of the engine.

Figure 1:
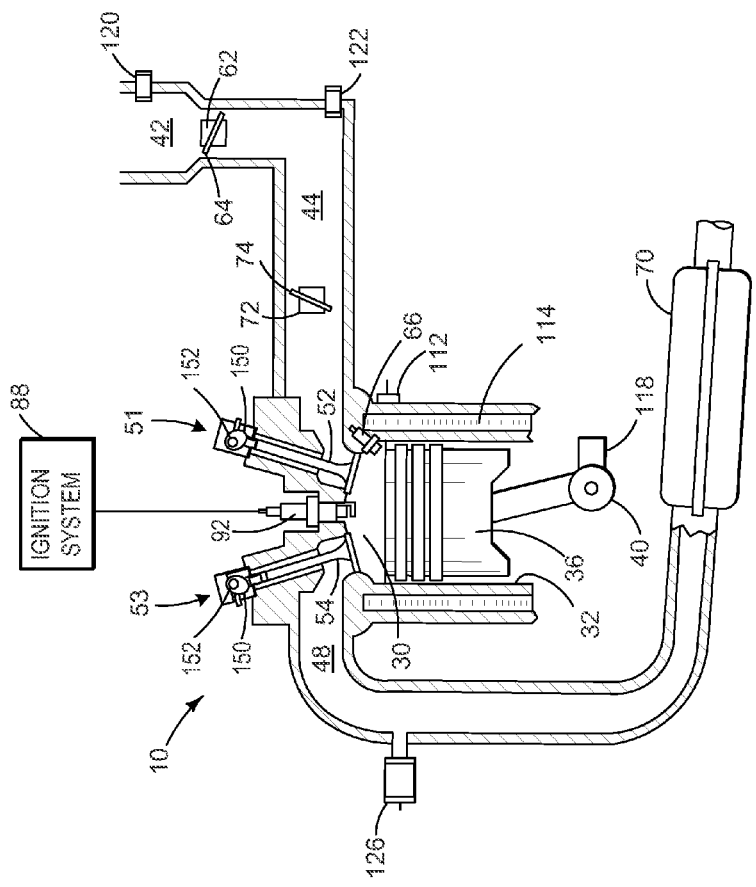
FIG. 1 shows a schematic diagram of an example internal combustion engine.
Figure 2A:
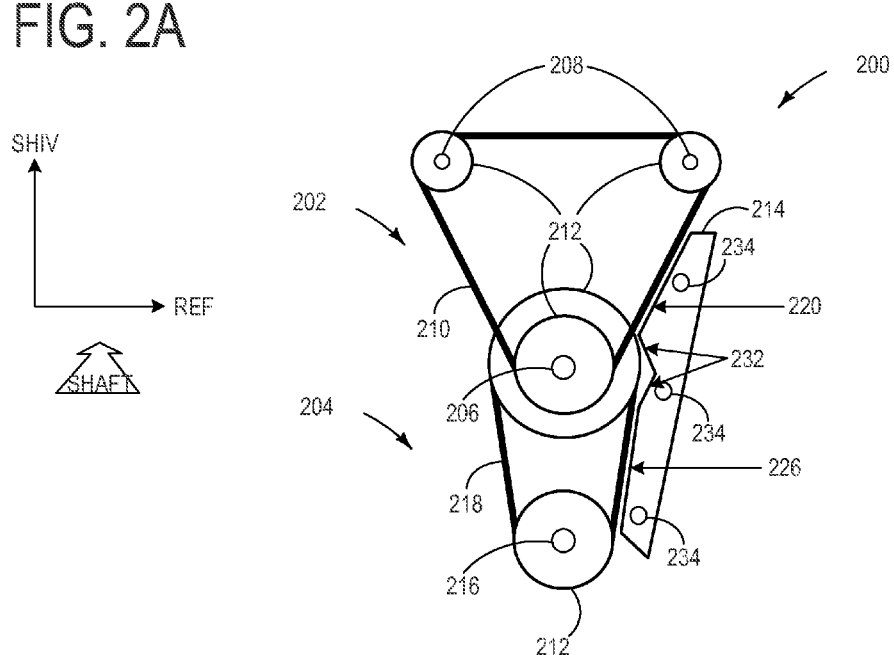
FIG. 2A shows a schematic diagram of an engine drive system according to an embodiment of the present disclosure.
Figure 2B:
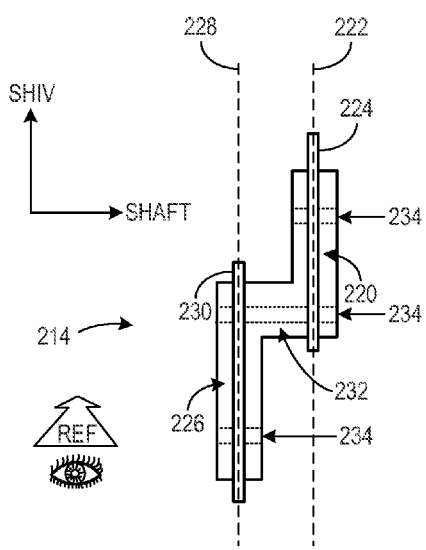
FIG. 2B shows a schematic diagram of an example spatial relationship of the engine drive system of FIG. 2A.
Figure 2C:
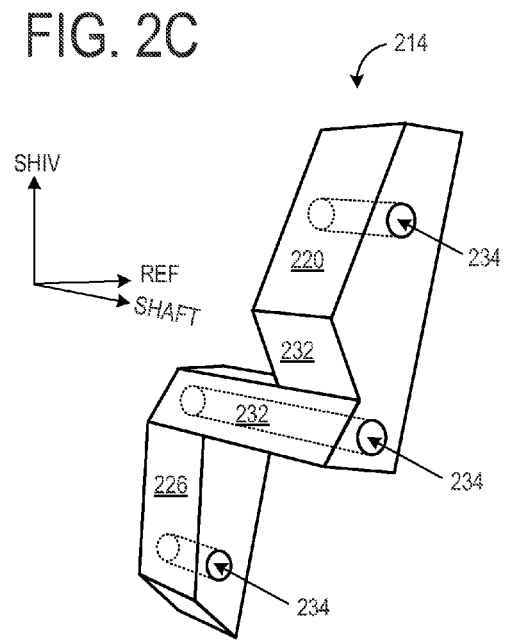
FIG. 2C shows a schematic diagram of an example chain guide for the engine drive system of FIG. 2A.
Figure 3A:
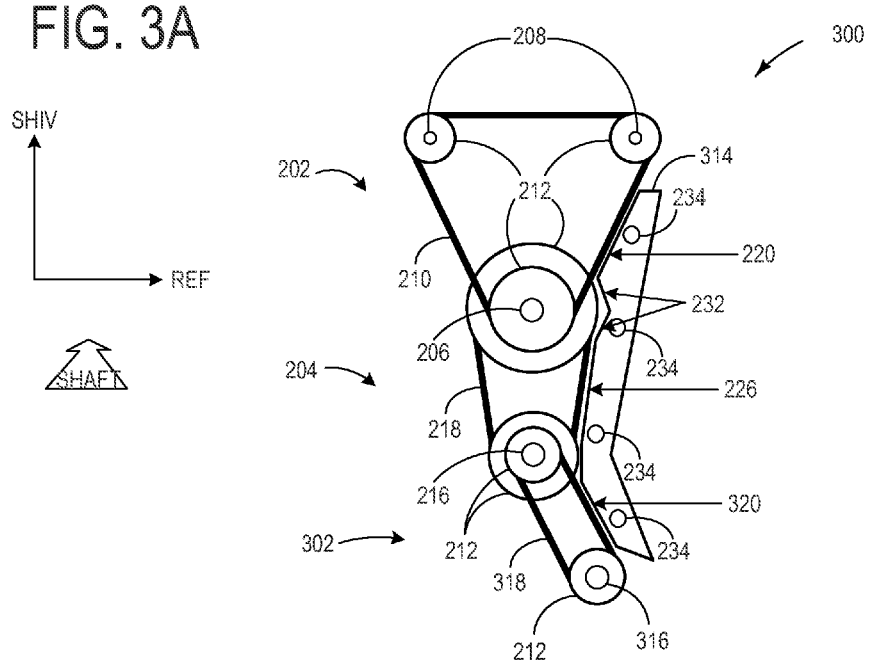
FIG. 3A shows a schematic diagram of another engine drive system according to an embodiment of the present disclosure.
Figure 3B:
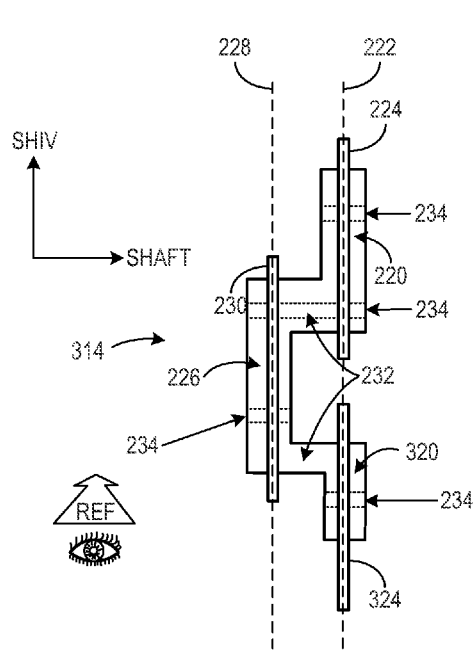
FIG. 3B shows a schematic diagram of an example spatial relationship of the engine drive system of FIG. 3A.
Figure 3C:
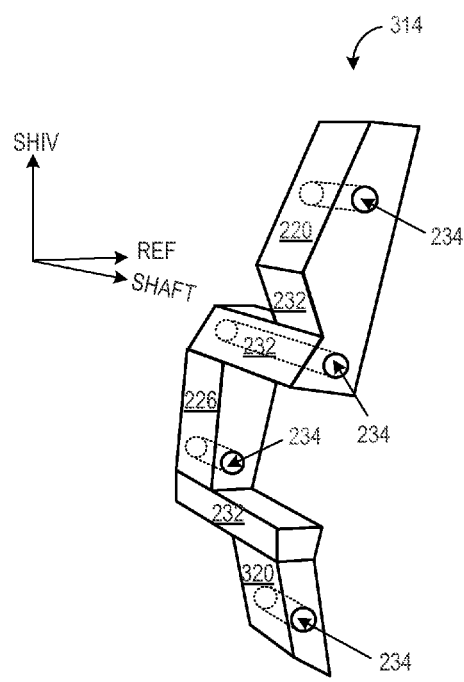
FIG. 3C shows a schematic diagram of an example chain guide for the engine drive system of FIG. 3A.
Figure 4:
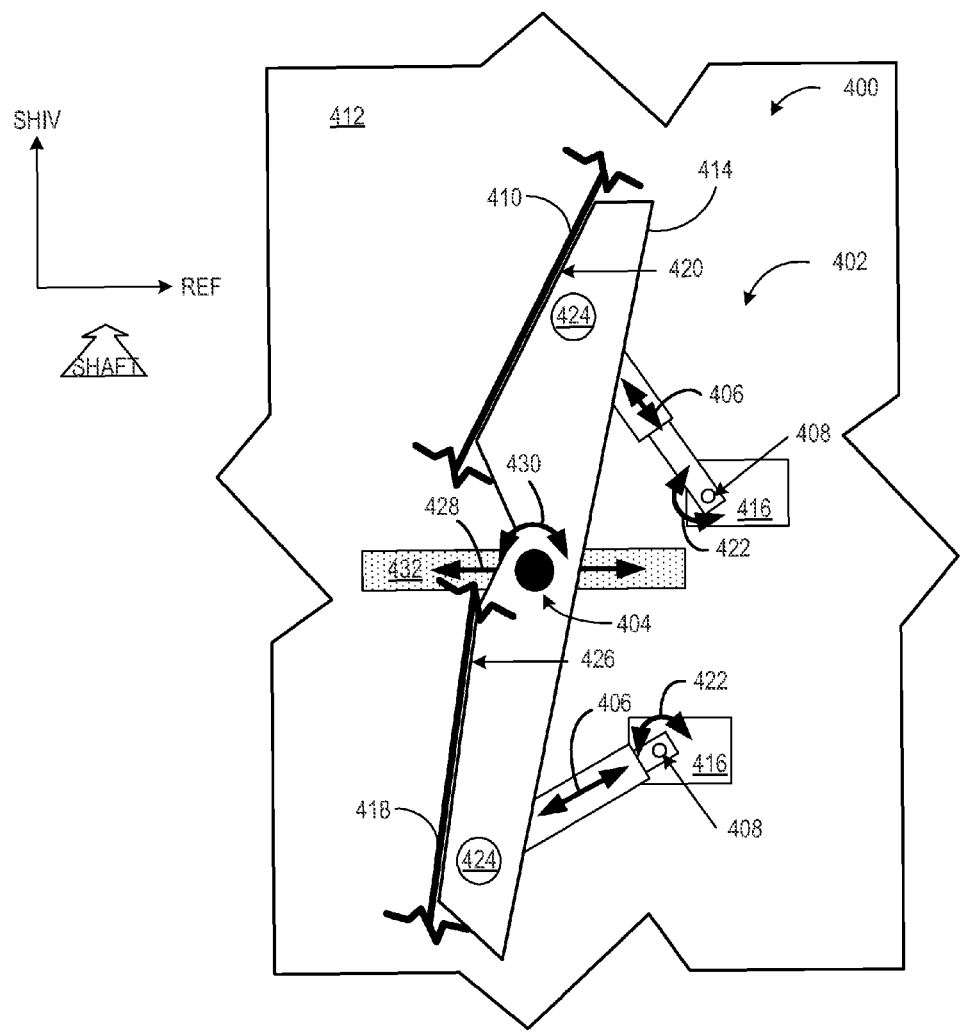
FIG. 4 shows the example chain guide of FIG. 2A including a tension adjustment mechanism for an engine drive system according to an embodiment of the present disclosure.
Figure 5:
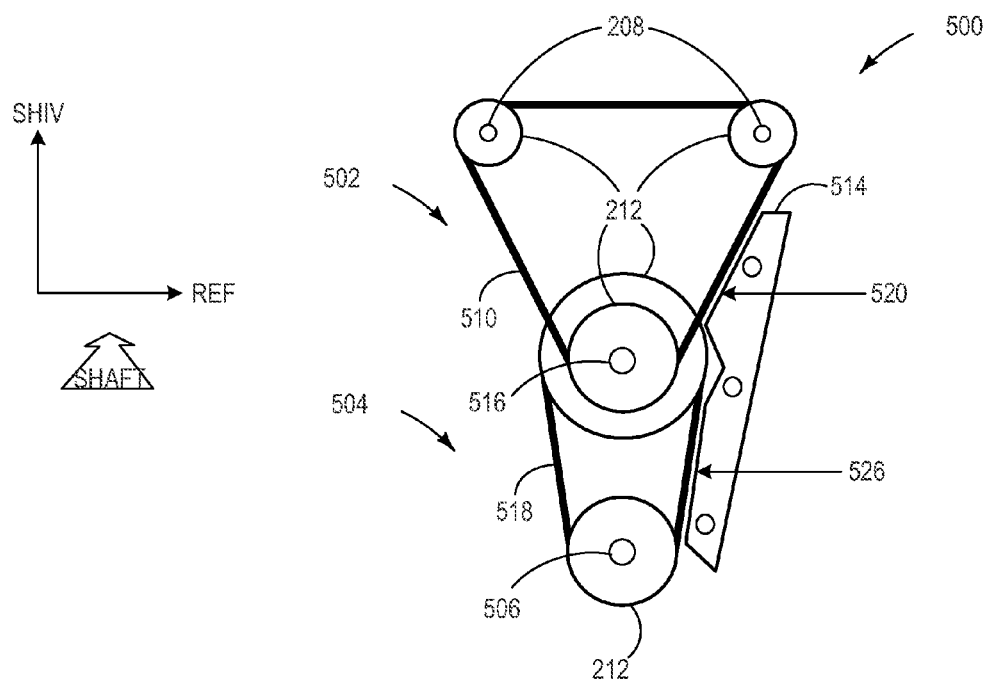
FIG. 5 shows a schematic diagram of another engine drive system according to an embodiment of the present disclosure.

An example internal combustion engine is depicted in FIG. 1. FIGS. 2A-C show an example drive system including an example embodiment of a chain guide. FIGS. 3A-C show another example drive system including another example embodiment of a chain guide. FIG. 4 shows an example chain guide including a tension adjustment mechanism. FIG. 5 shows another example drive system including an example embodiment of a chain guide.

Referring specifically to FIG. 1, it includes a schematic diagram showing one cylinder of multi-cylinder internal combustion engine 10. Engine 10 may be controlled at least partially by a control system (not shown) and by input from a vehicle operator (not shown), for example.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. As described in more detail below, crankshaft 40 may be coupled to an engine drive system via a chain, wherein a chain guide, at least part, maintains tension in the chain via a tension adjustment mechanism.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. As described in more detail below, cam actuation systems 51 and 53 may be coupled to a drive system via a chain, wherein a chain guide, at least part, maintains tension in the chain via a tension adjustment mechanism.

Cam actuation systems 51 and 53 may each include one or more cams 150 driven by a camshaft 152 and may utilize one or more of cam profile switching (CPS), variable cam timing (VCT), variable valve timing (VVT) and/or variable valve lift (VVL) systems that may be operated by a controller to vary valve operation.

Fuel injector 66 is shown coupled directly to combustion cylinder 30 for injecting fuel directly therein in proportion to a pulse width signal received from a controller via an electronic driver, for example. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a throttle 62 having a throttle plate 64 configured for electronic throttle control (ETC), which is provided as one non-limiting example. In this manner, throttle 62 may be operated to vary the intake air provided to combustion cylinder 30 among other engine combustion cylinders. Intake passage 42 may also include a charge motion control valve (CMCV) 74, a CMCV plate 72, a mass air flow sensor 120 and a manifold air pressure sensor 122, for example.

Ignition system 88 provides an ignition spark to combustion chamber 30 via spark plug 92 in response to a controller. Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

As described above, FIG. 1 shows only one cylinder of a multi-cylinder engine, and each cylinder may similarly include its own set of intake/exhaust valves, fuel injector, ignition system, etc. During operation, the multi-cylinder engine may undergo a four stroke cycle wherein the actuation of the crankshaft and camshafts are synchronized by an engine drive system, as described below. Further, the engine drive system may include various other accessory drives coupled to the engine drive system via one or more chains, belts, bands, etc. For example, an oil pump, balance shaft, fan, etc. may be driven by the disclosed engine drive system.

FIG. 2A illustrates an example engine drive system that may be included in engine 10 according to an embodiment of the present disclosure. FIG. 2B shows an example spatial relationship for the engine drive system of FIG. 2A. FIG. 2C shows an example chain guide for the engine drive system of FIG. 2A.

Referring first to FIG. 2A, system 200 may include engine drive system 202 and accessory drive system 204. As shown, engine drive system 202 may include crankshaft 206 coupled to camshafts 208 via first chain 210. First chain 210 may engage various drive sprockets 212 associated with crankshaft 206 and camshafts 208. Further, engine drive system 202 may include chain guide 214 to maintain tension in first chain 210. As shown, engine drive system 202 may be coupled to accessory drive system 204 such that each system includes crankshaft 206. However, it will be appreciated that the aforementioned drive systems may be coupled to each other such that the systems additionally or alternatively share another drive shaft. For example, the engine drive system and the accessory drive system may share a common accessory drive shaft.

Accessory drive system 204 may include crankshaft 206 coupled to accessory shaft 216 via second chain 218. Second chain 218 may engage various drive sprockets 212 associated with crankshaft 206 and accessory shaft 216, similar to engine drive system 202. Further, accessory drive system 204 may include chain guide 214 to maintain tension in second chain 218.

As described above, chain guide 214 may maintain tension in first chain 210 and second chain 218 concurrently. First chain 210 may be non-planer with second chain 218. Further, it will be appreciated that first chain 210 may be parallel and offset with respect to second chain 218, wherein offset is in a SHAFT direction, for example as illustrated in FIG. 2B. As such, chain guide 214 may include a first surface 220 to guidingly contact first chain 210, and a second surface 226 to guidingly contact second chain 218. As described in more detail below with respect to FIG. 4, a position of first surface 220 and second surface 226 may each move in response to each of a tension state of first chain 210 and second chain 218, where the movement is such that tension in both chains can be maintained (rather than tensioning of one chain resulting in loosening of the other chain). In this way, even though both the first surface 220 and the second surface 226 move in unison due to the unitary construction of the multi-surface chain guide 214, it is still possible to maintain tension in two separate chains in two distinct and parallel-offset planes. As one example, chain guide 214 may move in two directions (SHIV and REF) with two degrees-of-freedom, as described with regard to FIG. 4.

Turning now to FIG. 2B, a perspective view of chain guide 214 is shown. As introduced above, chain guide 214 may include first surface 220 and second surface 226 for guidingly contacting first chain 210 and second chain 218 respectively. First surface 220 may align with first plane 222 such that first plane 222 coincides with shiv line 224. As used herein, shiv line 224 indicates a general area that engine drive system 202 occupies as viewed from a reference (REF) perspective. As indicated in FIG. 2B, the REF perspective and hence a REF axis, may be normal to a SHIV axis and normal to a SHAFT axis. In this way, shiv line 224 may be described as a profile area associated with engine drive system 202. In particular, shiv line 224 may coincide with a general area that first chain 210 occupies as viewed from the REF perspective.

Further, second surface 226 may align with second plane 228, wherein second plane 228 coincides with shiv line 230. As used herein, shiv line 230 indicates a general area that accessory drive system 204 occupies as viewed from the REF perspective. In this way, shiv line 230 may be described as a profile area associated with accessory drive system 204. In particular, shiv line 230 may coincide with a general area that second chain 218 occupies as viewed along the SHIV axis.

First plane 222 and second plane 228 may be parallel to each other and extend in a direction along the SHIV axis and the REF axis, as best shown in FIG. 2B. Likewise, shiv line 224 and shiv line 230 may be parallel to each other in a direction along the SHIV axis. Since first surface 220 aligns with shiv line 224 and second surface 226 aligns with shiv line 230, the first and second surfaces have a spatial relationship such that the surfaces are offset from each other.

For example, as shown in FIG. 2B, the first and second surfaces may be separated by a distance along the SHAFT axis, wherein the SHAFT axis is perpendicular to the SHIV axis. In this way, first surface 220 and second surface 226 may have a spatial relationship such that these surfaces are separated by a distance along an axis perpendicular to the first and second planes. However, it will be appreciated that other spatial relationships are possible without departing from the scope of this disclosure.

FIG. 2C shows a perspective view of chain guide 214. As indicated above, chain guide 214 includes a first surface 220 and a second surface 226. Chain guide 214 may further include one or more intermediate surfaces 232 for rigidly connecting the first and second surfaces. For example, one or more of the intermediate surfaces 232 may be recessed to accommodate a drive shaft, a drive sprocket, and/or another component of the engine. However, it will be appreciated that the chain guide may be configured in another shape or size to negotiate a component of the engine drive system and/or another component of the engine, and recessed intermediate surfaces are provided as one non-limiting example.

Furthermore, chain guide 214 may include a plurality of apertures 234 for fastening the chain guide to an engine block, hydraulic adjusters, and/or pivots, for example. Chain guide 214 is shown with three apertures 234 in FIGS. 2A-C; however it will be appreciated that another number of apertures may be included to assist in fastening and controlling movement when the chain guide is installed in an engine. As one example, chain guide 214 may include one aperture. As another example, chain guide 214 may include more than one aperture. It will be appreciated that the one or more apertures may be threaded or un-threaded to appropriately accommodate a fastening member. For example, a fastening member such as a screw, a bolt, a pin, or virtually any type of fastening member may be used to securely fasten the chain guide to the engine block. Further, the one or more apertures 234 may be positioned in other locations on chain guide 214.

Additionally or alternatively, one or more apertures 234 may be configured to house a tensioning adjustment mechanism to adjust the tension in first chain 210 and/or second chain 218 by changing a position of first surface 220 and/or second surface 226, for example.

It will be appreciated that the various drive sprockets may be of a suitable shape and size. For example, one or more of the various drive sprockets may be a toothed sprocket, a grooved wheel, a toothed pulley, an un-toothed pulley or a wheel with virtually any profile configured to accommodate the first and second chains. Further, it will be appreciated that the first and second chains may be a timing chain, a timing band, a timing belt, or various other types of elastic and/or inelastic flexible bands.

Further, it will be appreciated that the engine drive system 202 and the accessory drive system 204 are shown in simplified form and as such are provided by way of example and are not meant to be limiting. The drive systems may include additional or alternative components than those shown in FIGS. 2A-C. For example, the drive systems may additionally or alternatively include one or more of a pulley, another drive sprocket, an idling device, etc. Further, it will be understood that one or more of the aforementioned components may engage with first or second chains on an inside surface and/or an opposing outside surface of the chain. As such, the first and second chains may follow a serpentine path, for example. As another example, system 200 may include more than one accessory drive system.

FIG. 3A illustrates an example engine drive system that may be included in engine 10 according to an embodiment of the present disclosure. FIG. 3B shows an example spatial relationship for the engine drive system of FIG. 3A. FIG. 3C shows an example chain guide for the engine drive system of FIG. 3A.

Referring first to FIG. 3A, system 300 may include engine drive system 202 and accessory drive system 204, as described above. System 300 may further include a second accessory drive system 302, and as such, accessory drive system 204 may be described as a first accessory drive system 204. As shown, first accessory drive system 204 may be coupled to second accessory drive system 302 such that each system includes accessory shaft 216. However, it will be appreciated that the aforementioned drive systems may be coupled to each other such that the systems additionally or alternatively share another drive shaft. It will be appreciated that system 300 may include components as already described above, and therefore such components may be referenced with common numbers. It will be appreciated that these components will not be discussed repetitively.

Second accessory drive system 302 may include first accessory shaft 216 coupled to second accessory shaft 316 via third chain 318. Third chain 318 may engage various drive sprockets 212 associated with the first and second accessory shafts, similar to system 200 as described above. Further, second accessory drive system 302 may include chain guide 314 to maintain tension in third chain 318.

It will be appreciated that some features of chain guide 314 may be similar to chain guide 214. Chain guide 314 may also differ to some degree. For example, chain guide 314 may include a first surface 220 for guidingly contacting first chain 210, a second surface 226 for guidingly contacting second chain 218, and may further include a third surface 320 for guidingly contacting third chain 318. In this way, chain guide 314 may maintain tension in first chain 210, second chain 218, and third chain 318 concurrently. First chain 210 and third chain 318 may be non-planer with second chain 218. However, it will be appreciated that first chain 210 and third chain 318 may be parallel and offset with respect to second chain 218, wherein offset is in a SHAFT direction, for example as illustrated in FIG. 3B. It will be appreciated that other chain configurations are possible without departing from the scope of this disclosure.

As described in more detail below with respect to FIG. 4, a position of first surface 220, second surface 226, and third surface 320 may each move in response to each of a tension state of first chain 210, second chain 218, and third chain 318, where the movement is such that tension in both chains can be maintained, as described above. In this way, even though the first surface 220, second surface 226, and third surface 320 move in unison due to the unitary construction of the multi-surface chain guide 314, it is still possible to maintain tension in three separate chains in two or more distinct and parallel-offset planes. As one example, chain guide 314 may move in two directions (SHIV and REF) with two degrees-of-freedom, as described with regard to FIG. 4.

Turning now to FIG. 3B, a perspective view of chain guide 314 is shown. As introduced above, chain guide 314 may include first surface 220, second surface 226, and third surface 320 for guidingly contacting first chain 210, second chain 218, and third chain 318 respectively. The spatial relationship between first surface 220 and second surface 226 has already been introduced above and will not be discussed repetitively.

Third surface 320 may align with first plane 222, wherein first plane 222 coincides with shiv line 224 and shiv line 324.

As used herein, shiv line 324 indicates a general area that second accessory drive system 302 occupies as viewed from a reference (REF) perspective. As indicated in FIG. 3B, the REF perspective and hence a REF axis, may be normal to a SHIV axis and normal to a SHAFT axis. In this way, shiv line 324 may be described as a profile area associated with second accessory drive system 302. In particular, shiv line 324 may coincide with a general area that third chain 318 occupies as viewed along the SHIV axis. As illustrated, shiv line 324 may be positioned below shiv line 224 along the SHIV axis. However, it will be appreciated that shiv line 324 may be positioned above shiv line 224.

As described above, first plane 222 and second plane 228 may be parallel to each other and extend in a direction along the SHIV axis and the REF axis. Likewise, shiv line 224, shiv line 230, and shiv line 324 may be parallel to each other in a direction along the SHIV axis. Since first surface 220 and third surface 320 align with shiv line 224, and second surface 226 aligns with shiv line 230, the surfaces have a spatial relationship such that the first and third surfaces are offset from the second surface.

For example as shown in FIG. 3B, the first, second, and third surfaces may be separated by a distance along the SHAFT axis, wherein the SHAFT axis is perpendicular to the SHIV axis. In this way, first surface 220 and third surface 320 may have a spatial relationship with second surface 226 such that these surfaces are separated by a distance along an axis perpendicular to the first and second planes. However, it will be appreciated that other spatial relationships are possible without departing from the scope of this disclosure.

For example, in some embodiments third surface 320 may align with a different plane. For example, third surface 320 may align with a third plane between first plane 222 and second plane 228. As another example, third surface 320 may align with a third plane such that first plane 222 is positioned between the third plane and second plane 228. As yet another example, third chain guiding surface 320 may align with a third plane such that second plane 228 is positioned between the third plane and the first plane 222. Virtually any configuration is possible without departing from the scope of this disclosure.

FIG. 3C shows a perspective view of chain guide 314. Similar to the above description, chain guide 314 may include one or more intermediate surfaces 232 for rigidly connecting the first, second, and third surfaces that guidingly contact a respective chain. For example, one or more of the intermediate surfaces may be recessed to accommodate a drive shaft, a drive sprocket, and/or another component of the engine. However, as described above, it will be appreciated that the chain guide may be configured in another shape or size to negotiate a component of the engine drive system and/or another component of the engine, and recessed intermediate surfaces are provided as one non-limiting example.

Furthermore, chain guide 314 may include one or more apertures 234 for fastening the chain guide to an engine block, hydraulic adjusters, and/or pivots, as described above. Additionally or alternatively, the one or more apertures 234 may be configured to house a tensioning adjustment mechanism to adjust the tension in first chain 210, second chain 218, and/or third chain 318 by changing a position of first surface 220, second surface 226, and/or third surface 320, for example.

It will be appreciated that the various drive sprockets may be of a suitable shape and size. For example, one or more of the various drive sprockets may be a toothed sprocket, a grooved wheel, a toothed pulley, an un-toothed pulley or a wheel with virtually any profile configured to accommodate the first and second chains. Further, it will be appreciated that the first and second chains may be a timing chain, a timing band, a timing belt, or various other types of elastic and/or inelastic flexible bands.

Further, it will be appreciated that second accessory drive system 302 is shown in simplified form and as such is provided by way of example and is not meant to be limiting. System 300 may include additional or alternative components than those shown in FIGS. 3A-C. For example, the drive systems may additionally or alternatively include one or more of a pulley, another drive sprocket, an idling device, etc. Further, it will be understood that one or more of the aforementioned components may engage with first chain, second chain, and/or third chain on an inside surface and/or an opposing outside surface of the chain. As such, the first chain, second chain, and/or third chain may follow a serpentine path, for example. As another example, system 300 may include more than two accessory drive systems.

As introduced above, a unitary chain guide such as chain guides 214 and 314 may be configured to maintain tension by contacting a plurality of separate chains/belts. For example, a tension state of a chain may change during operation (e.g., due to thermal expansion) and a tension adjustment system may be configured to accommodate such changes by adjusting a chain guide surface and/or a chain guide to maintain tension in each chain.

For example, chain guide 214 of FIG. 2 may be configured to move in a plurality of directions (e.g., with at least two degrees of freedom) so that the chain guide can accommodate unequal changes between two chains. As such, chain guide 214 may be configured to move a first surface to maintain tension in a first chain, and since the chain guide is a rigid unitary chain guide, the second surface may be moved as a result of moving the first surface. In this way, the movement of the second surface may be codependent upon the movement of the first surface in order to maintain adequate tension in two separate chains. Said in another way, the actuation of the second surface may be mutually dependent upon the actuation of the first surface. However, due to this codependency, the second surface may not guidingly contact the second chain in such a way so as to maintain adequate tension, for example. Thus, an additional tension adjustment mechanism may be incorporated to supplement a codependent surface actuation mechanism, when necessary.

For example, FIG. 4 shows an example chain guide 414 coupled to a tension adjustment system 400. As shown, the tension adjustment system 400 may include a codependent surface actuation mechanism 402 and a chain guide adjustment mechanism 404.

Codependent surface actuation mechanism 402 may be configured to actuate a first surface 420 and a second surface 426, such that the actuation of one surface may influence the position of the other surface in order to maintain adequate chain tension in two separate chains. Similar to the above descriptions for chain guides 214 and 314; first surface 420 and second surface 426 may be configured to guidingly contact a first chain 410 and a second chain 418, respectively. Since the tension state of the first and second chains may change, the first and second surfaces may be actuated by the codependent surface actuation mechanism 402 to compensate for differential slack generated between the plurality of chains and thus maintain desired tension in each of a plurality of chains, even though the first and second surfaces are spatially rigidly fixed to one another For example, codependent surface actuation mechanism 402 may be a hydraulic actuation system, and therefore may include one or more of a cylinder, a piston, a piston rod, a spring, a one-way valve, oil, air, etc. As shown, codependent surface actuation mechanism 402 may be configured to adjust a position of each of surfaces 420 and 426 in a linear direction as indicated by arrows 406.

Codependent surface actuation mechanism may include one or more engine block coupling components 408, configured to couple the codependent surface actuation mechanism to engine block 412. Further, engine block coupling components 408 may be coupled to engine block 412 via mounting portions 416. As shown, first surface 420 and second surface 426 may be coupled to different mounting portions of the engine block by their respective hydraulic actuation systems. However, it will be appreciated that codependent surface actuation mechanism 402 may be coupled to a continuous mounting surface of engine block 412. Further, engine block coupling components 408 may be configured to permit rotation about a SHAFT axis as indicated by arrows 422.

In this way, codependent surface actuation mechanism 402 may couple chain guide 414 to engine block 412. As such, codependent surface actuation mechanism 402 may further include chain guide coupling components 424. For example, chain guide coupling components 424 may be housed within an aperture of chain guide 414.

Chain guide adjustment mechanism 404 may be configured to change a position of chain guide 414 with at least two degrees of freedom. For example, chain guide adjustment mechanism 404 may be configured to permit relocation of chain guide 414 in a linear direction along a REF axis (as indicated by arrow 428), and/or permit rotation of chain guide 414 about a SHAFT axis (as indicated by arrow 430). In this way, chain guide adjustment mechanism 404 may include linear reposition as one degree of freedom and rotational reposition as another degree of freedom. It will be appreciated that each degree of freedom may impart chain guide repositioning on other axes than those indicated in the example above.

As shown in FIG. 4, chain guide adjustment mechanism 404 may be a pin configured to be tracked with a slot 432 of engine block 412. As such, the pin-slot configuration may enable linear movement and rotational movement of chain guide 414, as described above. However, it will be appreciated that other chain guide adjustment mechanisms are possible without departing from the scope of this disclosure.

In this way, chain guide adjustment mechanism 404 enables flexibility with maintaining adequate tension in two or more chains. Said in another way, when the surface actuation mechanism 402 alone does not maintain adequate tension in both chains, the chain guide adjustment mechanism 404 imparts a greater range for adjustment in order to maintain adequate tension in two or more chains.

As described above, the chain guide adjustment mechanism 404 enables two degrees of freedom so that tension can be maintained in both chain 410 and chain 418 at the same time, for example. In this way, the chain guide adjustment mechanism may supplement the codependent surface actuation mechanism to maintain adequate tension in each chain. Therefore, the chain guide may maintain tension in each chain of the engine drive system with the combined efforts of the codependent surface actuation mechanism and the chain guide adjustment mechanism. Thus, with at least two degrees of freedom, the tension adjustment system may maintain tension in two or more chains even when the chains may have different tension states.

It will be appreciated that tension adjustment system 400 is shown in simplified form for ease of understanding, and as such is not intended to be technically accurate. Further, it will be appreciated that mechanisms other than hydraulic actuators may be used without departing from the scope of this disclosure. For example, the tension adjustment system may additionally or alternatively include one or more spring-loaded mechanical tensioners, or another mechanism for actuating one or more surfaces and/or the chain guide as a whole.

Similar to chain guide 414, it will be appreciated that a chain guide with more than two surfaces (e.g., chain guide 314 of FIG. 3A) may be actuated to maintain tension in more than two chains. As such, a chain guide with more than two surfaces each in guidingly contact with a chain may include a codependent surface actuation mechanism, and a chain guide adjustment mechanism, for example.

Further, it will be appreciated that the example chain guides provided herein are non-limiting. As such, virtually any geometric shape and size is possible without departing from the scope of this disclosure. Further, the chain guide may be made of any suitable material. As one non-limiting example, the chain guide may be made of galvanized steel.

Further, it will be appreciated that the illustrations are provided by way of example and as such, are not meant to be limiting. Rather, the illustrations depict a general concept of a single chain guide maintaining tension in two or more chains. It is to be understood that the example drive systems may be arranged in another suitable configuration than those depicted in FIGS. 2A and 3A. As one example, an accessory shaft may be positioned between the camshafts and the crankshaft in the SHIV direction. In this way, a first chain may couple the camshafts and the accessory shaft, and a second chain may couple the accessory shaft and the crankshaft.

For example, FIG. 5 illustrates an example engine drive system that may be included in engine 10 according to an embodiment of the present disclosure. As shown, system 500 may include drive system 502 and drive system 504. Drive system 502 may include accessory driveshaft 516 coupled to camshafts 208 via first chain 510. First chain 510 may engage various drive sprockets 212 associated with accessory driveshaft 516 and camshafts 208. Further, drive system 502 may include chain guide 514 to maintain tension in first chain 510, similar to chains guides 214 and 314 as described above.

As shown, drive system 502 may be coupled to drive system 504 such that each system includes accessory driveshaft 516. Therefore, accessory driveshaft 516 may be coupled to a sprocket 212 to guide first chain 510 and another sprocket 212 to guide second chain 518. However, it will be appreciated that the aforementioned drive systems may be coupled to each other such that the systems additionally or alternatively share another drive shaft.

As shown, drive system 504 may include crankshaft 506 coupled to accessory driveshaft 516 via second chain 518. Second chain 518 may engage various drive sprockets 212 associated with crankshaft 506 and accessory driveshaft 516, similar to engine drive system 502. Further, drive system 504 may include chain guide 514 to maintain tension in second chain 518 similar to chains guides 214 and 314 as described above.

As described above, chain guide 514 may maintain tension in first chain 510 and second chain 518 concurrently. First chain 510 may be non-planer with second chain 518. Further, it will be appreciated that first chain 510 may be parallel and offset with respect to second chain 518, wherein offset is in a SHAFT direction, for example as illustrated in FIG. 2B. As such, chain guide 514 may include a first surface 520 to guidingly contact first chain 510, and a second surface 526 to guidingly contact second chain 518. Similar to the above description for FIG. 4, a position of first surface 520 and second surface 526 may each move in response to each of a tension state of first chain 510 and second chain 518, where the movement is such that tension in both chains can be maintained (rather than tensioning of one chain resulting in loosening of the other chain). In this way, even though both the first surface 520 and the second surface 526 move in unison due to the unitary construction of the multi-surface chain guide 514, it is still possible to maintain tension in two separate chains in two distinct and parallel-offset planes. As one example, chain guide 214 may move in two directions (SHIV and REF) with two degrees-of-freedom, as described above with regard to FIG. 4.

Further, it will be appreciated that the drive shafts and associated sprockets/wheels are not necessarily drawn to scale. As such, other drive ratios are possible without departing from the scope of this disclosure. As one example, a crankshaft to camshaft ratio may be 2:1. Therefore, it will be appreciated that engine 10 of FIG. 1 may be a four stroke engine and as such for every two revolutions of the crankshaft the camshaft will rotate through one revolution. However, it will be appreciated that the chain guide of the present disclosure may be configured for other engines with other drive ratios without departing from the scope of this disclosure.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
a camshaft;
a crankshaft;
an accessory driveshaft;
a first chain coupling the camshaft and crankshaft in a first plane and engaging camshaft and crankshaft drive sprockets;
a second chain coupling the accessory driveshaft and crankshaft in a second plane non-planar to the first plane and engaging crankshaft and accessory driveshaft drive sprockets; and
a chain guide including first and second surfaces guidingly contacting the first and second chains, respectively.

2. The system of claim 1, wherein the first surface and the second surface are separated by a distance along an axis perpendicular to the first and second planes.

3. The system of claim 1, further including one or more intermediate surfaces connecting the first and second surfaces.

4. The system of claim 3, wherein at least one of the one or more intermediate surfaces are recessed to accommodate a drive shaft and/or drive sprocket.

5. The system of claim 1, wherein the first and second surfaces align with shiv lines of the first and second chains.

6. The system of claim 1, wherein the chain guide includes one or more apertures, wherein each aperture is configured for fastening the chain guide to an engine block or for housing a tensioning adjustment mechanism.

7. The system of claim 1, further including a tensioning actuation system with the ability to actuate the chain guide to be movably coupled to an engine block with at least two degrees-of-freedom in order to maintain adequate tension in the first chain and the second chain.

8. The system of claim 1, further comprising:
a second accessory drive; and
a third chain coupling the first and second accessory drives in a third plane, the third plane non-planar to at least one of the first plane and the second plane;
wherein the chain guide further includes a third surface guidingly contacting the third chain.

9. The system of claim 8, wherein the third surface is separated from the second surface by a distance along an axis perpendicular to the first, second, and third planes.

10. The system of claim 9, further including one or more intermediate surfaces connecting the first, second, and third surfaces, the one or more intermediate surfaces configured to align the first, second, and third surfaces with a respective shiv line.

11. The system of claim 1, wherein the first surface of the chain guide is coupled to a codependent tension actuation mechanism to maintain tension in the first chain;
wherein the second surface of the chain guide is coupled to the codependent tension actuation mechanism to maintain tension in the second chain, the first surface offset from the second surface by an axial distance along a shaft axis,
wherein the codependent tension actuation mechanism actuates the first surface and the second surface,
wherein the first and second surfaces are spatially rigidly fixed to one another by a recessed intermediate surface extending along the shaft axis.

12. The system of claim 11, wherein the codependent tension actuation mechanism enables the chain guide to be moveable with at least two degrees-of-freedom.

13. The system of claim 11, further including a chain guide adjustment mechanism to supplement the codependent tension actuation mechanism, the chain guide adjustment mechanism configured to change a position of the chain guide in order to maintain adequate tension in the first and second chains, and the chain guide adjustment mechanism comprising a pin configured to be tracked within a slot of an engine block.

14. The system of claim 13, wherein the chain guide adjustment mechanism enables rotational movement and linear movement of the chain guide.

15. The system of claim 11, further comprising a third surface of the chain guide, the third surface coupled to the codependent tension actuation mechanism, wherein the third surface guides a third chain, the third surface offset from the first surface and/or second surface along the shaft axis.

16. The system of claim 11, wherein the recessed intermediate surface accommodates a drive shaft and/or drive sprocket.

17. A system for an engine comprising:
a camshaft;
a crankshaft;
an accessory driveshaft;

a first chain coupling the camshaft and crankshaft in a first plane and engaging drive sprockets of the camshaft and crankshaft;

a second chain coupling the accessory driveshaft and crankshaft in a second plane non-planar to the first plane and engaging drive sprockets of the crankshaft and accessory driveshaft; and a chain guide, movable in at least two degrees-of-freedom, including a first surface guidingly contacting the first chain and a second surface guidingly contacting the second chain.

18. The system of claim 17, wherein the two degrees-of-freedom includes rotational movement and linear movement.

19. The system of claim 18, wherein movement of the chain guide is achieved by a codependent surface actuation mechanism and a chain guide adjustment mechanism, each mechanism configured to permit rotational and linear movement.

\* \* \* \* \*